United States Patent Office 3,083,400
Patented Apr. 2, 1963

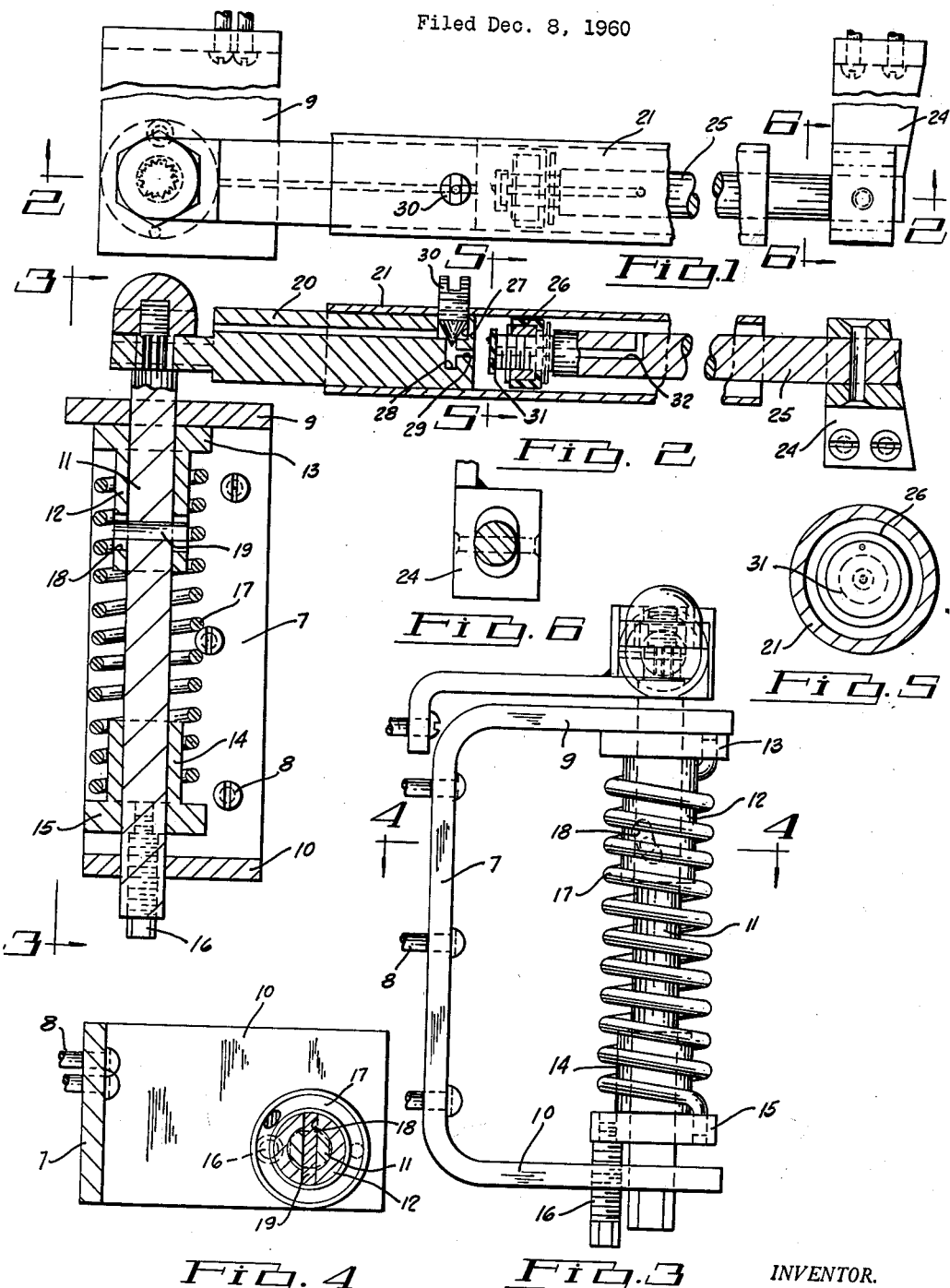

3,083,400
DOOR CHECK
Fred L. Anderson, 12310 Ilene, Detroit, Mich.
Filed Dec. 8, 1960, Ser. No. 74,718
4 Claims. (Cl. 16—70)

My invention relates to a new and useful improvement in a door check adapted for use on a swinging door to check the swinging of the door from open to closed position and to assure the swinging of the door to closed position after it has been open.

It is an object of the present invention to provide a door check which will be simple of structure, economical of manufacture, durable, compact, easily and quickly installed, and highly efficient in use.

Another object of this invention is the provision of a door check of this class having a spring provided with a structure whereby the tension of the spring will remain constant regardless of the width of the opening of the door.

Another object of the present invention is to have a structure of this class in which a spring is used and a means is afforded for setting and adjusting the tension of the spring.

Other objects will appear hereinafter.

It is recognized that various modifications and changes may be made in the detail of the structure illustrated and the present disclosure is considered to be but the preferred embodiment.

Forming a part of this application are drawings in which,

FIG. 1 is a top plan view of the invention,

FIG. 2 is a vertical sectional view of the invention,

FIG. 3 is a view taken at right angles to that shown in FIG. 2 with parts in section, and, FIG. 4 is an enlarged sectional view taken on line 4—4 of FIG. 3.

FIG. 5 is an enlarged sectional view taken on line 5—5 of FIG. 2.

FIG. 6 is a sectional view taken on line 6—6 of FIG. 1.

In the structure illustrated, I provide a U-shaped bracket 7 fastened by screws or nails 8 to the door frame. Projecting through the legs 9 and 10 of the U-shaped bracket is a pin or bolt 11 which is rotatable and fixed against axial movement. Embracing the pin or bolt 11 at the upper end is a sleeve 12 having a collar 13. The pin or bolt 11 rotates in the sleeve 12.

Mounted on the pin or bolt 11 at the lower end thereof is a sleeve 14 having a collar 15 forming a part thereof. This sleeve 14 is connected to a screw 16 which is threaded through the leg 10 so that the sleeve 14 may be moved axially relatively to the pin or bolt 11 but is fixed rotatively relatively thereto. A coil spring 17 embraces the bolt 11 and the sleeves 12 and 14 and has an angularly turned end projecting into the collar 15. By threading the screw 16, the compression of the spring may be varied and the distance between the collars 13 and 15 may thus be adjusted.

Formed in the sleeve 12 are diametrically opposite diagonal slots 18. A stud 19 is projected through the bolt 11 and engages in the slots 18.

Fixedly mounted on the upper end of the bolt or pin 11, is an arm 20 which projects into a tube 21. Formed in the arm 20 is a recess 27 communicating with a passage 28 which communicates with the passage 29 to the interior of the tube 21. Mounted on the swinging door is a bracket 24 to which is pivotally connected the rod 25 carrying on its inner end the piston 26 which snugly engages in the tube 21. A screw 30 is threaded into the member 20 to serve as a valve for controlling the amount of air which may escape from the passages 28 and 29 and the recess 27 from the interior of the tube 21.

When the door is swung open, the rod 25 will be retracted and drawn outwardly of the tube 21 although not far enough to be entirely removed from the tube. When the door is swung to open position, the bolt or pin 11 will rotate. As this rotation continues, upon swinging of the door to open position, the sleeve 12 with the collar 13 will, on account of engagement with the pin 19 in the slots 18, move downwardly so as to increase the tension of the spring by bringing the ends of the spring closer together. This approach of the ends of the spring towards each other causes a compression of the spring 17, and in approaching each other, the tension of the spring resulting from the increased winding is increased. The inclination of the slots 18 determines the increases of the tension resulting from the increase of winding from the spring, this tension being dependent upon the size of the wire forming the spring, or the material from which the spring is made. The inclination of the slots 18 is such that the unwinding at the upper end will be equal to the winding at the opposite end so that the torque resulting from the winding of the spring 17 will be constant. Should it be desired to adjust the tension of the spring 17, this may be accomplished through the screwing of the screw 16.

Fastened on the end of the rod 25 is a flap valve 31 which serves to control the end of the passage 32. Construction is such that upon moving of the rod 25 in one direction, the passage 32 will be closed and upon moving in the opposite direction, air will be permitted to pass from the tube 21 through the passage 32.

What I claim is:

1. A door check of the class described, comprising a U-shaped bracket adapted for mounting on a stationary body and having a pair of spaced apart upper and lower legs; a pin projected through said legs and rotatable relatively thereto; a sleeve embracing said pin adjacent one end; a collar mounted on one end of said sleeve; a second sleeve embracing said pin adjacent the opposite end; a collar mounted on said second sleeve; a screw means for adjusting said position of said second named collar relative to the lower leg of said bracket and moving said second named collar toward and away from said first named collar; a spring embracing said pin and extending from collar to collar and having an angularly turned end projecting into each of said collars; said first named sleeve having a pair of diametrically opposite inclined slots; and a stud projecting through said pin and engaging in said slots; an arm fixedly mounted and projected outwardly from said pin; a tube mounted on and projected outwardly from said arm, said arm having a bleed opening formed therein communicating with the interior of said tube; a valve for controlling said bleed opening; a rod swingably mounted at one end of a swinging door and projecting into said tube; and, a piston carried by said rod and snugly engaging said tube.

2. A door check of the class described, comprising a U-shaped bracket adapted for mounting on a stationary body and having a pair of spaced apart upper and lower legs; a pin projected through said legs and rotatable relatively thereto; a sleeve embracing said pin adjacent one end; a collar mounted on one end of said sleeve; a second sleeve embracing said pin adjacent the opposite end; a collar mounted on said second sleeve; a screw means for adjusting said position of said second named collar relative to the lower leg of said bracket and moving said second named collar toward and away from said first named collar; a spring embracing said pin and extending from collar to collar and having an angularly turned end projecting into each of said collars; said first named sleeve having a pair of diametrically opposite inclined slots; a stud projecting through said pin and engaging in said slots; an arm fixedly connected on said pin and projecting outwardly therefrom; a tube mounted on said arm and projecting outwardly therefrom; a rod pivotally connected to one end of a swingable door and projected at its opposite end into said tube; and a piston mounted on said opposite end of said rod and snugly engaging said tube, the swinging of said door effecting a rotation of said pin.

3. A door check of the class described, comprising a U-shaped bracket adapted for mounting on a stationary body and having a pair of spaced apart upper and lower legs; a pin projected through said legs and rotatable relatively thereto; a sleeve embracing said pin adjacent one end; a collar mounted on one end of said sleeve; a second sleeve embracing said pin adjacent the opposite end; a collar mounted on said second sleeve; a screw means for adjusting said position of said second named collar relative to the lower leg of said bracket and moving said second named collar toward and away from said first named collar; a spring embracing said pin and extending from collar to collar and having an angularly turned end projecting into each of said collars; said first named sleeve having a pair of diametrically opposite inclined slots; a stud projecting through said pin and engaging in said slots; an arm fixedly connected on said pin and projecting outwardly therefrom; a tube mounted on said arm and projecting outwardly therefrom; a rod pivotally connected to one end of a swingable door and projected at its opposite end into said tube; and a piston mounted on said opposite end of said rod and snugly engaging said tube, the swinging of said door effecting a rotation of said pin and said stud and a displacement of the first named sleeve toward said second named sleeve for varying the compression of said spring upon rotation of said pin.

4. A door check of the class described, comprising a U-shaped bracket adapted for mounting on a stationary body and having a pair of spaced apart upper and lower legs; a pin projected through said legs and rotatable relatively thereto; a sleeve embracing said pin adjacent one end; a collar mounted on one end of said sleeve; a second sleeve embracing said pin adjacent the opposite end; a collar mounted on said second sleeve; a screw means for adjusting said position of said second named collar relative to the lower leg of said bracket and moving said second named collar toward and away from said first named collar; a spring embracing said pin and extending from collar to collar and having an angularly turned end projecting into each of said collars; said first named sleeve having a pair of diametrically opposite inclined slots; a stud projecting through said pin and engaging in said slots; an arm fixedly connected on said pin and projecting outwardly therefrom; a tube mounted on said arm and projecting outwardly therefrom; a rod pivotally connected to one end of a swingable door and projected at its opposite end into said tube; a piston mounted on said opposite end of said rod and snugly engaging said tube, the swinging of said door effecting a rotation of said pin and said stud varying the compression of said spring upon rotation of said pin; and said collars adjusting the compression of said spring upon relative displacement of said collars towards each other.

References Cited in the file of this patent
UNITED STATES PATENTS
2,666,944   Stehlin ---------------- Jan. 26, 1954